United States Patent
Park

(10) Patent No.: US 9,061,384 B2
(45) Date of Patent: Jun. 23, 2015

(54) MULTIPLE PARTS MOVING SYSTEM CAPABLE OF MOVING PARTS INDIVIDUALLY

(71) Applicant: Hyundai Motor Company, Seoul (KR)

(72) Inventor: Sang Kyu Park, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 13/899,846

(22) Filed: May 22, 2013

(65) Prior Publication Data
US 2014/0183000 A1 Jul. 3, 2014

(30) Foreign Application Priority Data
Dec. 31, 2012 (KR) .................. 10-2012-0158058

(51) Int. Cl.
*B65G 29/00* (2006.01)
*B23P 21/00* (2006.01)
*B65G 35/00* (2006.01)

(52) U.S. Cl.
CPC *B23P 21/00* (2013.01); *B65G 35/00* (2013.01)

(58) Field of Classification Search
CPC .............................. B65G 35/00; B23P 21/00
USPC .......... 198/463.1, 468.01, 468.2, 468.9, 717, 198/736, 750.11
See application file for complete search history.

(56) References Cited

FOREIGN PATENT DOCUMENTS

| JP | 11-193802 A | 7/1999 |
|---|---|---|
| JP | 2002-120925 A | 4/2002 |
| JP | 2003-2538 A | 1/2003 |
| JP | 2004-229455 A | 8/2004 |
| KR | 10-0820328 B1 | 4/2008 |
| WO | WO 2009/114407 A1 | 9/2009 |

*Primary Examiner* — William R Harp
(74) *Attorney, Agent, or Firm* — Morgan, Lewis & Bockius LLP

(57) ABSTRACT

A multiple parts moving system used in a production line, and more particularly, to a multiple parts moving system capable of moving a plurality of parts to be moved individually or uniformly in a production line, the multiple parts moving system including: a main frame; a stroke motion motor that is mounted on the main frame; a first holding portion that is connected to the stroke motion motor to be interlocked with the stroke motion motor and that fixes parts to be moved selectively; and a second holding portion that is connected to the main frame to be fixed onto the main frame and fixes the parts to be moved selectively.

9 Claims, 4 Drawing Sheets

MULTIPLE PARTS MOVING SYSTEM CAPABLE OF MOVING PARTS INDIVIDUALLY

CROSS-REFERENCE TO RELATED PATENT APPLICATION

The present application claims priority of Korean Patent Application Number 10-2012-0158058 filed Dec. 31, 2012, the entire contents of which application is incorporated herein for all purposes by this reference.

BACKGROUND OF INVENTION

1. Field of Invention

The present invention relates to a multiple parts moving system used in a production line, and more particularly, to a multiple parts moving system capable of moving a plurality of parts to be moved individually or uniformly in the production line.

2. Description of Related Art

Most of car production processes is automatized, and a car is manufactured by performing several processes of assembling twenty to thirty thousands of parts in a production line of a car maker.

Various types of moving systems that are designed to be suitable for each process, are disposed in such an automatized production line of a car. These moving systems move desired parts to a predetermined position of each process or a position of next process.

As one of the moving systems, there is a multiple parts moving system that is capable of moving a plurality of parts to be moved uniformly at one time.

The multiple parts moving system has an advantage of moving a plurality of objects at one time by using a particular driving source. Thus, the multiple parts moving system is suitable for moving parts so that a plurality of works can be carried out in the same production line.

Meantime, in the multiple parts moving system, when selective movement is required in each line, or in case of a production line where a movement distance between parts to be moved needs to be individually controlled, a moving system that is capable of individually controlling movement of each parts to be moved of the multiple parts moving system, is required.

In a multiple parts moving system that is capable of moving parts individually according to the related art, movement of parts to be moved is individually controlled by each of a plurality of motors installed at the multiple parts moving system. However, as the number of motors increases, cost for production facility increases, and management including maintenance and the like of the multiple parts moving system is difficult, and there is a difficulty in controlling each motor individually in an actual process.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention provides a multiple parts moving system that is capable of moving a plurality of parts to be moved by using a single driving source uniformly at one time and is capable of controlling a movement distance between some parts to be moved individually.

According to an aspect of the present invention, there is provided a multiple parts moving system capable of moving parts individually, including: a main frame; a stroke motion motor that is mounted on the main frame; a first holding portion that is connected to the stroke motion motor to be interlocked with the stroke motion motor and that fixes parts to be moved selectively; and a second holding portion that is connected to the main frame to be fixed onto the main frame and fixes the parts to be moved selectively.

The first holding portion may be connected to the stroke motion motor by a motor connection bracket, and the motor connection bracket may be driven forwards and backwards by the stroke motion motor and may allow the first holding portion to be moved in a straight direction.

The second holding portion may be connected to the main frame to be fixed onto the main frame by a fixing bracket so that a position change in a straight movement direction of the first holding portion does not occur.

The first holding portion may include a plurality of movement actuators that is configured to grasp parts to be moved by pressurizing both sides of the parts to be moved in a direction perpendicular to the straight movement direction of the first holding portion.

The second holding portion may include a plurality of fixed-position actuators that is configured to grasp parts to be moved by pressurizing both sides of the parts to be moved in a direction perpendicular to the straight movement direction of the first holding portion.

The multiple parts moving system may further include a controller that controls actuation of the first holding portion and the second holding portion so that the parts to be moved are selectively fixed to the first holding portion and the second holding portion.

When a plurality of parts to be moved is simultaneously moved, the controller may control actuation of the first holding portion and the second holding portion so that the first holding portion fixes the parts to be moved and the second holding portion releases fixing of the parts to be moved.

When some parts to be moved are selectively moved, the controller may control actuation of the first holding portion and the second holding portion so that parts to be selectively moved are fixed by the first holding portion and fixing of the parts to be selectively moved is released by the second holding portion, fixing of parts not to be moved is released by the first holding portion and the parts not to be moved are fixed by the second holding portion.

The multiple parts moving system may further include movement guides that guide the parts to be moved according to straight movement of the first holding portion and a guide bracket that fixes the movement guides onto the main frame.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Various embodiments of the present invention includes a first holding portion and a second holding portion as units for moving parts to be moved selectively by grasping the parts to be moved and illustrates a case that the first holding portion and the second holding portion pressurize the parts to be moved by turning on/off actuators so that the parts to be moved can be fixed to each of the first holding portion and the second holding portion. However, the first holding portion and the second holding portion are not limited thereto, and it should be noted that the first holding portion and the second holding portion involve all structures capable of fixing the parts to be moved selectively.

Figure 1:
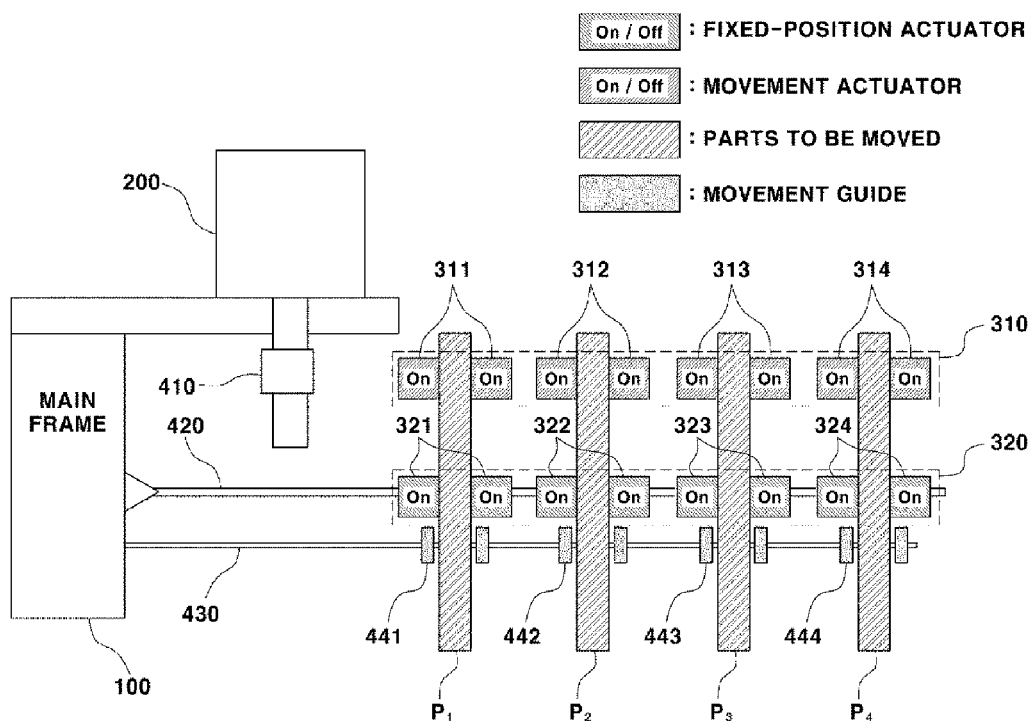
FIG. 1 is a schematic view of a structure of an exemplary multiple parts moving system capable of moving parts individually according to the present invention.
Figure 2:
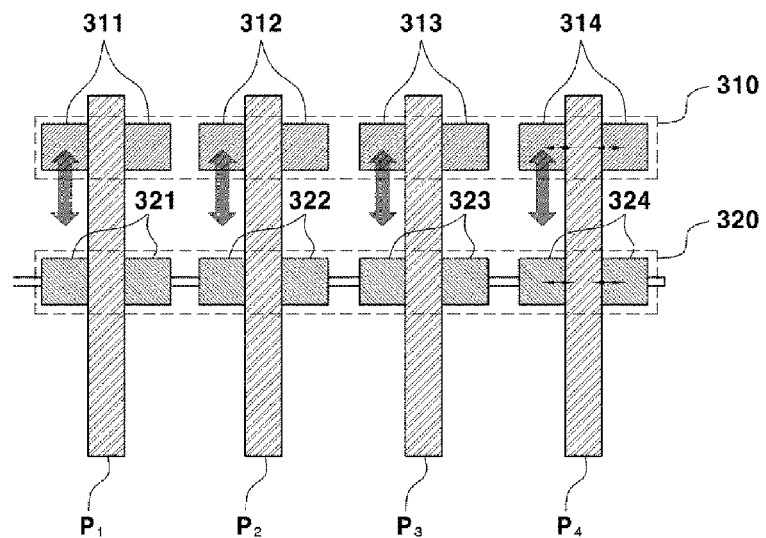
FIG. 2 illustrates movement directions and actuation directions of fixed-position actuators and movement actuators of the multiple parts moving system of FIG. 1.

FIG. 1 is a schematic view of a structure of a multiple parts moving system capable of moving parts individually according to various embodiments of the present invention, and FIG. 2 illustrates movement directions and actuation directions of fixed-position actuators and movement actuators of the multiple parts moving system illustrated in FIG. 1.

Referring to FIG. 1, the multiple parts moving system according to various embodiments of the present invention includes a main frame 100 and a stroke motion motor 200 that is mounted on the main frame 100 and provides a driving force for moving parts to be moved.

The stroke motion motor 200 is installed at one side of the main frame and allows the parts to be moved to move relative to the main frame 100 fixed in a process line, as illustrated in FIG. 1.

Also, in various embodiments of the present invention, the multiple parts moving system further includes two holding portions that may hold the parts to be moved selectively. Two holding portions include a first holding portion 310 that fixes the parts to be moved selectively for movement of the parts to be moved and a second holding portion 320 that fixes the parts to be moved selectively so as to fix positions of the parts to be moved.

The first holding portion 310 is connected to the stroke motion motor 200 and is configured to be movable relative to the main frame 100 by the driving force provided by the stroke motion motor 200. Also, the second holding portion 320 is connected to the main frame 100 and is configured to fix the positions of the parts to be moved to the main frame 100, unlike the first holding portion 310.

The first holding portion 310 and the second holding portion 320 may include a plurality of actuators that are integrally driven in such a way that a plurality of parts to be moved can be simultaneously moved. The first holding portion 310 and the second holding portion 320 may include a plurality of movement actuators 311, 312, 313, and 314 and a plurality of fixed-position actuators 321, 322, 323, and 324 that correspond to the number of parts to be moved, as illustrated in FIG. 1.

FIG. 1 illustrates an example in which four parts to be moved including a first parts to be moved P1, a second parts to be moved P2, a third parts to be moved P3, and a fourth parts to be moved P4 are movable.

Thus, the multiple parts moving system of FIG. 1 includes a first movement actuator 311, a second movement actuator 312, a third movement actuator 313, and a fourth movement actuator 314 that correspond to the number of parts to be moved and further includes a first fixed-position actuator 321, a second fixed-position actuator 322, a third fixed-position actuator 323, and a fourth fixed-position actuator 324 that correspond to the number of parts to be moved.

In this case, each of the movement actuators 311, 312, 313, and 314 may be configured to be connected to the stroke motion motor 200 by a motor connection bracket 410, as illustrated in FIG. 1. Thus, each of the movement actuators 311, 312, 313, and 314 is configured to move simultaneously as the motor connection bracket 410 is moved by the stroke motion motor 200.

Also, each of the fixed-position actuators 321, 322, 323, and 324 is directly connected to the main frame 100 by a fixing bracket 420 and thus is fixed onto the main frame 100, as illustrated in FIG. 1. Thus, the fixed-position actuators 321, 322, 323, and 324 do not receive the driving force generated by the stroke motion motor 200, unlike the movement actuators 311, 312, 313, and 314. Thus, positions of the fixed-position actuators 321, 322, 323, and 324 are not moved to movement directions of the movement actuators 311, 312, 313, and 314 such that movement of the parts to be moved is substantially limited.

FIG. 2 illustrates movement directions and actuation directions of the fixed-position actuators 321, 322, 323, and 324 and the movement actuators 311, 312, 313, and 314 of the multiple parts moving system illustrated in FIG. 1. Referring to FIG. 2, the movement actuators 311, 312, 313, and 314 that constitute the first holding portion 310 are moved in a straight direction, as indicated by vertical arrows of FIG. 2, as the motor connection bracket 410 descends and is driven by the driving force of the stroke motion motor 200. Also, the fixed-position actuators 321, 322, 323, and 324 that constitute the second holding portion 320 are mounted on the main frame 100 so that their positions are fixed.

The movement actuators 311, 312, 313, and 314 and the fixed-position actuators 321, 322, 323, and 324 may be configured to have actuation directions in which the parts to be moved are held and are fixed to each actuator. Thus, each actuator is configured to fix or release the parts to be moved by pressurizing the parts to be moved along the actuation directions.

The actuation directions may be set to directions that are perpendicular to movement directions of the parts to be moved (movement directions of the movement actuators), as illustrated in FIG. 2.

Thus, the parts to be moved that are selectively fixed to the movement actuators 311, 312, 313, and 314 and the fixed-position actuators 321, 322, 323, and 324, are moved to the movement directions by the stroke motion motor 200, or positions of the parts to be moved may be fixed without being moved.

Also, the multiple parts moving system of FIG. 1 may be configured to include movement guides 441, 442, 443, and 444 that guide the parts to be moved to be moved according to straight movement of the movement actuators 311, 312, 313, and 314, and a guide bracket 430 that fixes the movement guides 441, 442, 443, and 444 onto the main frame 100.

Although not shown, the multiple parts moving system of FIG. 1 includes a controller that controls actuation of each actuator so that the parts to be moved can be selectively moved to the movement actuators 311, 312, 313, and 314 and the fixed-position actuators 321, 322, 323, and 324.

The controller controls the movement actuators 311, 312, 313, and 314 and the fixed-position actuators 321, 322, 323, and 324, thereby substantially controlling movement of the plurality of parts to be moved.

In detail, when the controller controls the movement actuators 311, 312, 313, and 314 and the fixed-position actuators 321, 322, 323, and 324 so that the parts to be moved can be simultaneously moved, the controller controls each actuator so that the movement actuators 311, 312, 313, and 314 fix the parts to be moved and the parts to be moved are not fixed to the fixed-position actuators 321, 322, 323, and 324. Thus, the parts to be moved that are fixed to the movement actuators 311, 312, 313, and 314 are simultaneously moved by the stroke motion motor 200 at the same movement distance.

Figure 3:
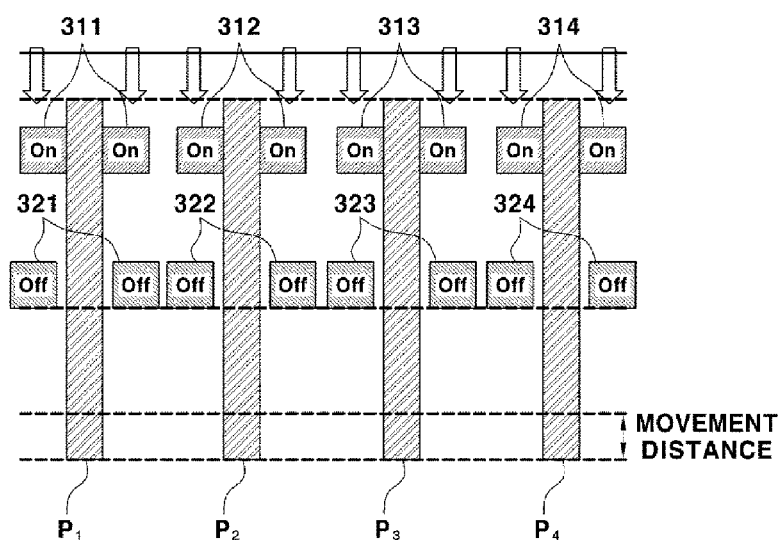
FIG. 3 illustrates a case that a plurality of parts to be moved is moved at the same movement distance by using the multiple parts moving system of FIG. 1.

Simultaneous movement of the parts to be moved by actuator control is shown in FIG. 3.

That is, illustrated in FIG. 3, the fixed-position actuators 321, 322, 323, and 324 that are directly connected to the main frame 100, do not confine the parts to be moved. Thus, limitation of movement of the parts to be moved is released, and each of the movement actuators 311, 312, 313, and 314 confines the parts to be moved. Thus, as the movement actuators 311, 312, 313, and 314 descend, the parts to be moved descend simultaneously in connection therewith.

The controller may control the movement actuators 311, 312, 313, and 314 and the fixed-position actuators 321, 322, 323, and 324 so that some parts to be moved can be selectively moved. In detail, when the controller controls the movement actuators 311, 312, 313, and 314 and the fixed-position actuators 321, 322, 323, and 324, only the parts to be moved are fixed to the movement actuators 311, 312, 313, and 314 corresponding to the number of the parts to be moved, and parts not to be moved are not confined by the movement actuators 311, 312, 313, and 314 but are fixed to the fixed-position actuators 321, 322, 323, and 324 corresponding to the number of parts not to be moved.

Figure 4:
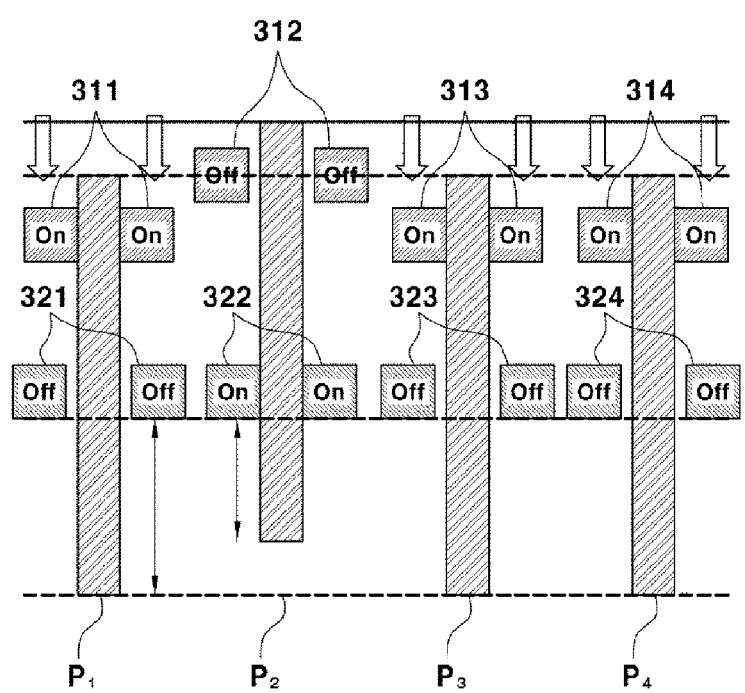
FIG. 4 illustrates a case that a movement distance between parts to be moved is individually controlled as some parts to be moved are selectively moved by the multiple parts moving system of FIG. 1.

An actuation example of selective movement of the parts to be moved is shown in FIG. 4.

In detail, FIG. 4 illustrates an actuation example in which the controller controls the movement actuators 311, 312, 313, and 314 and the fixed-position actuators 321, 322, 323, and 324 so that three parts to be moved P1, P3, and P4 apart from the second parts to be moved P2 can be moved. Referring to FIG. 4, that three parts to be moved, i.e., the first parts to be moved P1, the third parts to be moved P3, and the fourth parts to be moved P4 are fixed to the corresponding movement actuators 311, 313, and 314, and the second parts to be moved P2 are fixed to the corresponding fixed-position actuator 312, so that some selected parts to be moved P1, P3, and P4 can be moved.

Thus, in the actuation example, as illustrated in FIG. 4, only desired parts to be moved can be selectively moved so that a movement distance between the parts to be moved can be differently controlled.

Also, although not shown, selective movement control is repeatedly performed so that the movement distance between the parts to be moved can be individually set.

Figure 5:
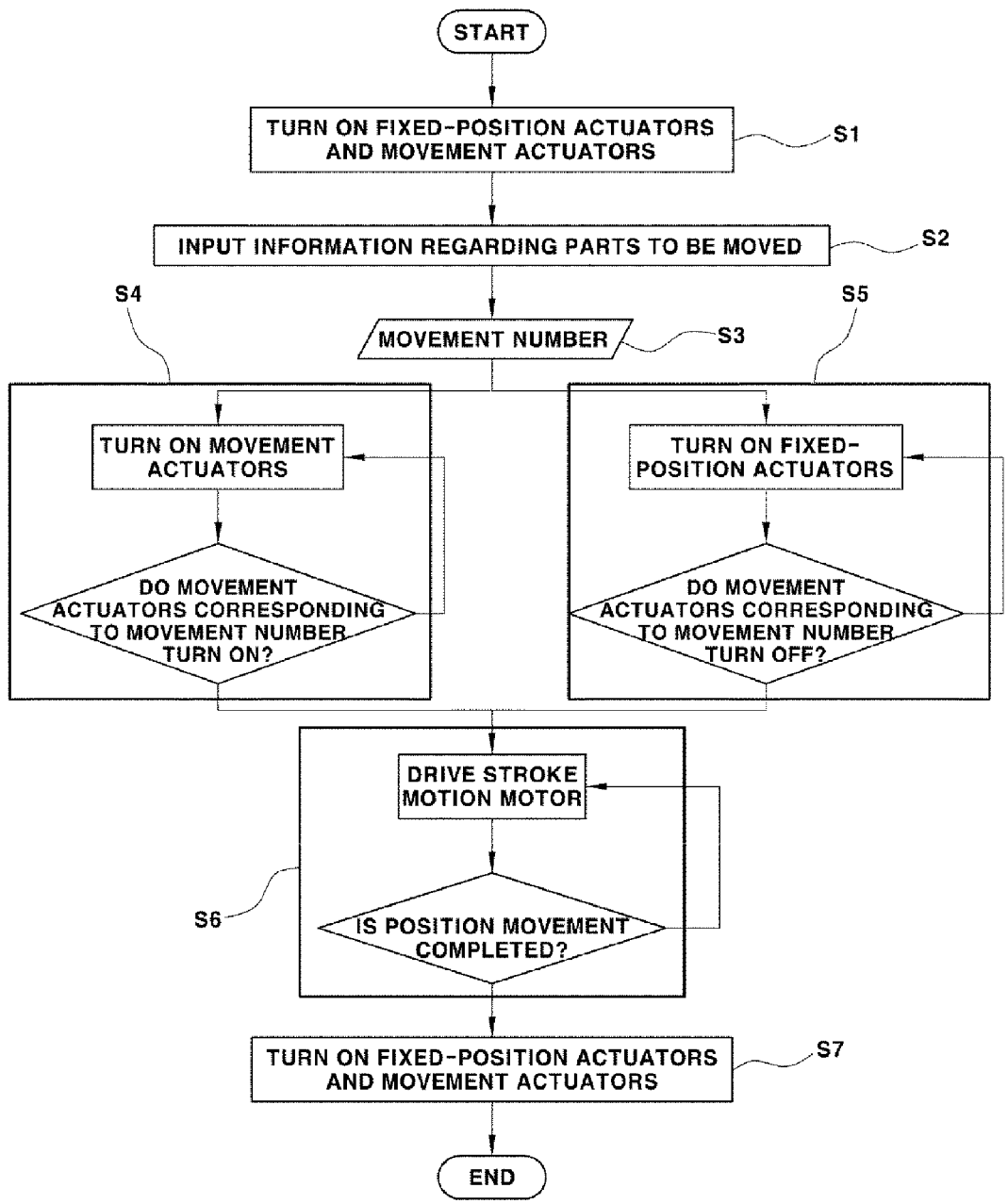
FIG. 5 is a schematic flowchart illustrating an operation of controlling actuators of the multiple parts moving system of FIG. 1.

FIG. 5 is a schematic flowchart illustrating an operation of controlling actuators of the multiple parts moving system of FIG. 1.

First, an operation of preparing movement of parts to be moved, i.e., an operation of turning on fixed-position actuators and movement actuators and fixing the parts to be moved on the actuators (S1) is performed. The operation is not an essential operation; however, the operation may be included as a preparation operation of checking whether the parts to be moved are located on the actuators and standing-by actuation instructions of the actuators.

If the preparation operation is completed, information regarding the parts to be moved are input (S2), and the movement number of the parts to be moved is checked based on the input information (S3).

The movement actuators corresponding to the number of the parts to be moved are turned on according to the input information regarding the parts to be moved and the parts to be moved are fixed to the movement actuators, whereas the fixed-position actuators are turned off so that fixing of the parts to be moved by the fixed-position actuators is released. In this case, operations (S4, S5) of comparing the checked movement number of the parts to be moved, the number of the turned-on movement actuators, and the number of the turned-off fixed-position actuators may be performed.

Positions of the parts to be moved are moved by driving the stroke motion motor connected to the movement actuators, and it is checked whether position movement is completed (S6), and then the control operation may be terminated.

In this case, after position movement is completed, as illustrated in FIG. 5, like in the initial preparation operation, an operation of turning on the movement actuators and the fixed-position actuators (S7) may be further performed.

As described above, in a multiple parts moving system according to the present invention, a movement distance between parts to be moved can be individually controlled so that the position of each parts can be selectively adjusted if necessary, space of a production line can be efficiently used, various works can be selectively carried out according to parts to be moved and thus a degree of freedom of process design increases.

Also, in the multiple parts moving system according to the present invention, even though a plurality of motors corresponding to the number of parts to be moved is not installed, a movement distance between parts to be moved can be selectively controlled by using one motor so that facility can be simplified and maintenance can be easily carried out.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multiple parts moving system capable of moving parts individually, comprising:
 a main frame;
 a stroke motion motor mounted on the main frame;
 a first holding portion connected to the stroke motion motor to be interlocked with the stroke motion motor and that fixes parts to be moved selectively; and
 a second holding portion connected to the main frame to be fixed onto the main frame and which selectively fixes the parts to be moved,
 wherein the first holding portion includes a plurality of movement actuators grasping the parts to be moved by pressurizing both sides of the parts to be moved, and
 wherein the second holding portion includes a plurality of fixed-position actuators grasping the parts to be moved by pressurizing both sides of the parts to be moved.

2. The multiple parts moving system of claim 1, wherein the first holding portion is connected to the stroke motion motor by a motor connection bracket, and the motor connection bracket is driven forward and backward by the stroke motion motor and allows the first holding portion to be moved in a straight direction.

3. The multiple parts moving system of claim 2, wherein the second holding portion is connected to the main frame to be fixed onto the main frame by a fixing bracket so that a position change in a straight movement direction of the first holding portion does not occur.

4. The multiple parts moving system of claim 2, further comprising movement guides that guide the parts to be moved according to the straight movement of the first holding portion and a guide bracket that fixes the movement guides onto the main frame.

5. The multiple parts moving system of claim 2, wherein the plurality of movement actuators pressurize both sides of the parts to be moved in a direction perpendicular to the straight movement direction of the first holding portion.

6. The multiple parts moving system of claim 2, wherein the plurality of fixed-position actuators pressurize both sides of the parts to be moved in a direction perpendicular to the straight movement direction of the first holding portion.

7. The multiple parts moving system of claim 1, further comprising a controller that controls actuation of the first holding portion and the second holding portion so that the parts to be moved are selectively fixed to the first holding portion and the second holding portion.

8. The multiple parts moving system of claim 7, wherein, when a plurality of parts to be moved are simultaneously moved, the controller controls actuation of the first holding portion and the second holding portion so that the first holding portion fixes the parts to be moved and the second holding portion releases fixing of the parts to be moved.

9. The multiple parts moving system of claim 7, wherein, when some parts to be moved are selectively moved, the controller controls actuation of the first holding portion and the second holding portion so that parts to be selectively moved are fixed by the first holding portion and fixing of the parts to be selectively moved is released by the second holding portion, fixing of parts not to be moved is released by the first holding portion and the parts not to be moved are fixed by the second holding portion.

* * * * *